United States Patent Office 3,632,521
Patented Jan. 4, 1972

3,632,521
LUTETIUM NEODYMIUM DOPED YTTRIUM ALUMINUM GARNET
William W. Holloway, Jr., Sudbury, and Michael Kestigian, Stow, Mass., assignors to Sperry Rand Corporation
Filed Oct. 4, 1968, Ser. No. 765,222
Int. Cl. C09k 1/68; H01s 3/16
U.S. Cl. 252—301.4 R
3 Claims

ABSTRACT OF THE DISCLOSURE

A laser crystal material characterized by narrow band fluorescence and high efficiency at room temperatures. The material is described by the formula $$Y_{3-x-y}Nd_xLu_yAl_5O_{12}$$

wherein neodymium and lutetium are jointly substituted for yttrium in the garnet $Y_3Al_5O_{12}$, $x$ being in the range from about 0.015 to about 0.6 and $y$ being in the range from about 0.006 to about 1.2. The neodymium and lutetium ions are larger and smaller, respectively, than the yttrium ion which they replace in the garnet lattice. The lutetium alleviates the size mismatch between the neodymium and yttrium ions to permit increased concentration of the neodymium active ion in the garnet without sacrifice of optical quality.

BACKGROUND OF THE INVENTION

Yttrium aluminum garnet, $Y_3Al_5O_{12}$ (YAG), has been shown to possess many of the properties desired of laser host materials. In comparison to other common laser hosts such as calcium fluoride, calcium tungstate, various mixed tungstates and molybdates, and the glasses, YAG offers lower laser thresholds, higher thermal conductivity and diffusivity, smaller coefficient of thermal expansion, and a greater hardness and durability. Accordingly, much recent work has been devoted to YAG and, in particular, to neodymium-doped YAG.

One of the major problems associated with the inclusion of the neodymium ion in $Y_3Al_5O_{12}$ is the relatively low concentration of the active neodymium ions which can be incorporated into YAG hosts, particularly when grown by the Czochralski method. Efforts to prepare crystals of $Nd_3Al_5O_{12}$ (wherein there is complete substitution by the $Nd^{3+}$ ion for the $Y^{3+}$ ion) have not met with success irrespective of the method employed. The difficulty incorporating the neodymium ion into a YAG host may be reduced but not eliminated by employing extremely slow crystal growth rates. The large size of the neodymium $Nd^{3+}$ ion relative to the $Y^{3+}$ ion which it replaces causes a strain in the YAG crystal with the result that the neodymium ions tend to remain a maximum distance apart in the crystal. In addition, "coring" effects have been noted in Czochralski-grown, neodymium doped $Y_3Al_5O_{12}$ crystals with a consequent degradation of optical quality and laser characteristics.

SUMMARY OF THE INVENTION

In accordance with the present invention, the concentration of neodymium ions in YAG host materials is increased beyond prior art limits by compensating for the large size of the neodymium ion relative to the yttrium ion by the introduction into the garnet material of an ion smaller than the yttrium ion. Thus, the crystalline lattice strains that would otherwise be caused by the oversized neodymium ions are significantly relieved by the presence of the smaller ions. When the smaller ion is lutetium, increased concentration of neodymium is realized without sacrifice of the desirably narrow linewidth or optical quality of the resulting lutetium-neodymium-doped yttrium aluminum garnet.

Figure 4:
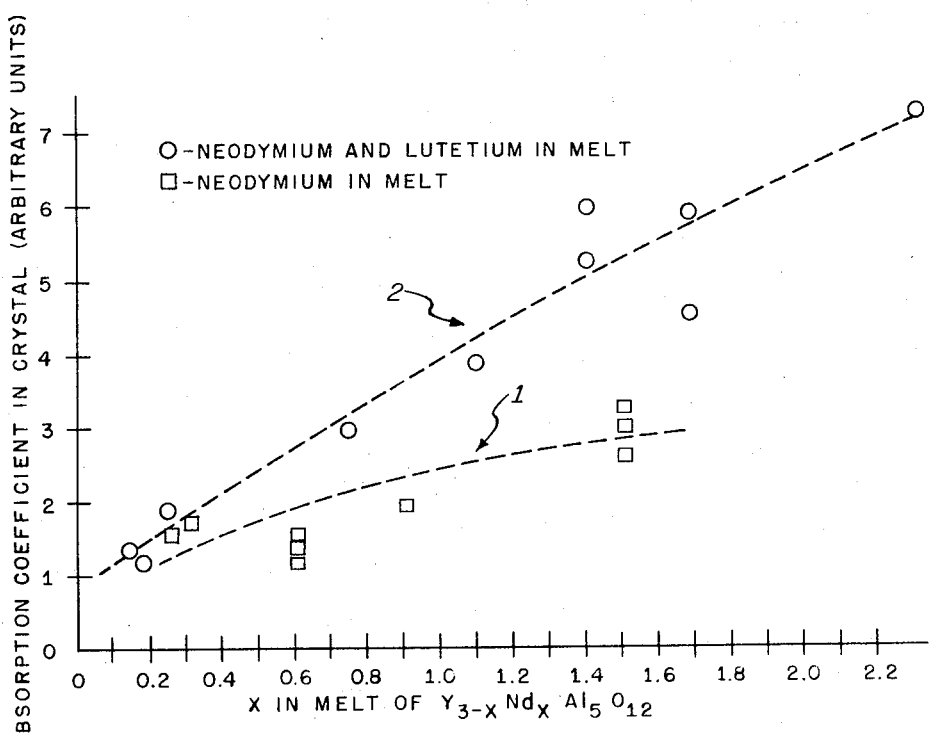
Figure 5:
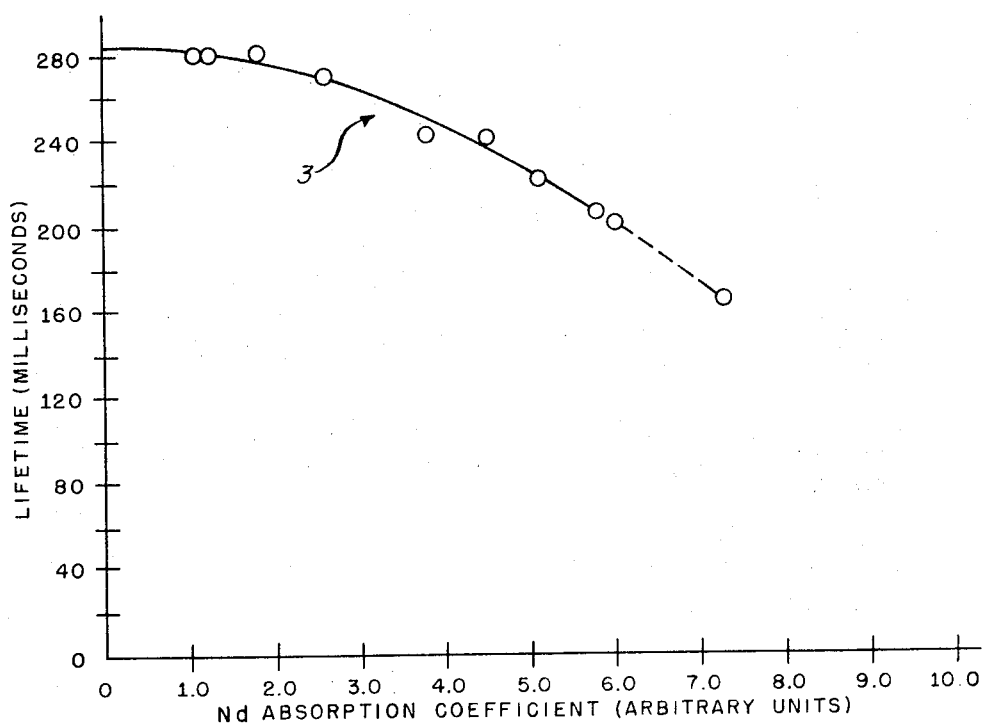

at room temperature;

FIG. 4 is a plot representing the effect of the addition of lutetium on the concentration of neodymium in YAG; and FIG. 5 is a plot representing the lifetime of the neodymium ion relative to the neodymium concentration in YAG.

DESCRIPTION OF THE PREFERRED EMBODIMENT

Two techniques have been considered to increase the concentration of the neodymium ions in $Y_3Al_5O_{12}$. In the first technique, the average lattice parameters of the YAG are expanded by the inclusion of larger ions in the yttrium site or in the aluminum site of the crystal. Although substitution in either site is possible, there appears to be the fundamental limitation that too large an ion or too high a concentration substituted in the $Y^{3+}$ ion site does not allow the formation of crystals. For example, as previously pointed out, attempts have failed to grow the material $Nd_3Al_5O_{12}$ wherein there is complete substitution of neodymium for yttrium. The substitution in the aluminum site by a larger ion (such as gallium) is somewhat more promising because crystals can be formed in the entire range of solid solutions from $Y_3Al_5O_{12}$ to $Y_3Ga_5O_{12}$. However, an undesirable broadening of the fluorescent linewidth has been observed at room temperatures in the case of mixed crystals of $Y_3Al_2Ga_3O_{12}$:Nd.

Figure 1:
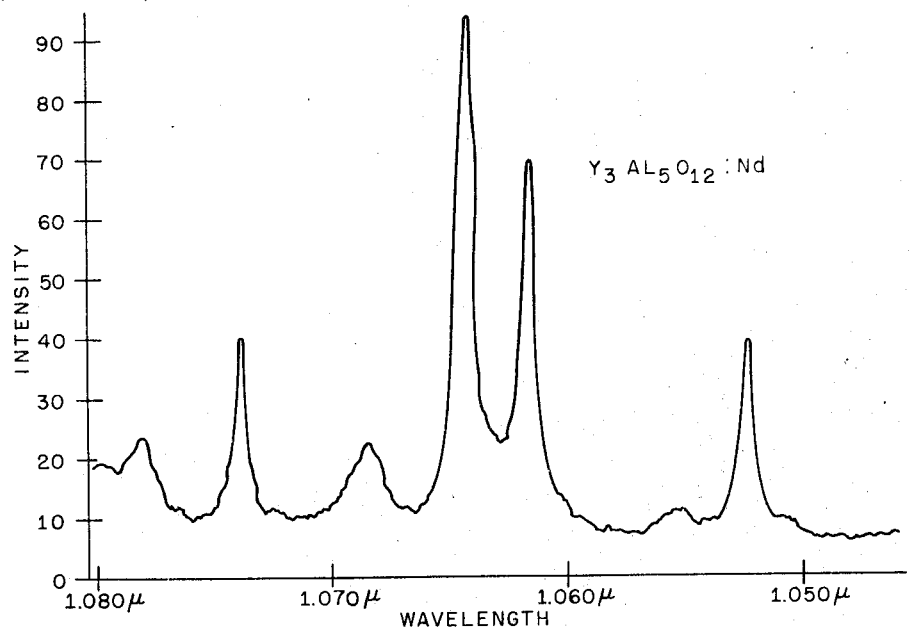
FIG. 1 is an intensity plot of fluorescent transitions of $Y_3Al_5O_{12}$:Nd at room temperature.
Figure 2:
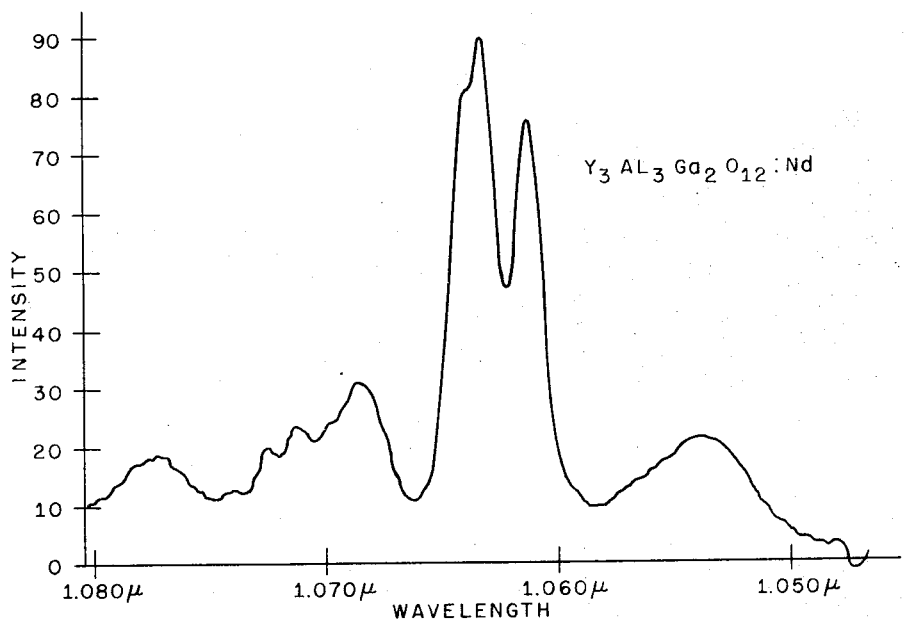
FIG. 2 is an intensity plot of the comparable fluorescent transitions of $Y_3Al_3Ga_2O_{12}$:Nd at room temperature.
Figure 3:
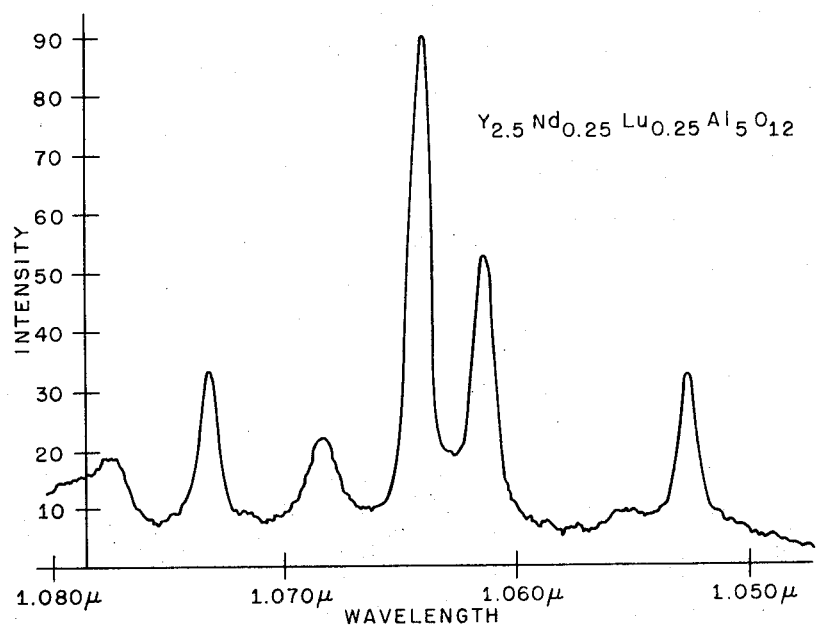
FIG. 3 is an intensity versus wavelength plot of the comparable fluorescent transistions of $$Y_{2.5}Nd_{0.25}Lu_{0.25}Al_5O_{12}$$

The unwanted broadening of the linewidth of the fluorescent transitions can be seen by a comparison of FIGS. 1 and 2. FIG. 1 is an intensity versus wavelength plot of the fluorescent transitions in crystals of neodymium-doped $Y_3Al_5O_{12}$ at room temperature. FIG. 2 is an intensity versus wavelength plot of the fluorescent transitions in crystals of neodymium-doped $Y_3Al_3Ga_2O_{12}$ which is a typical species of solid solution of $Y_3Al_5O_{12}$ and $Y_3Ga_5O_{12}$. The considerable broadening of the linewidth of the transitions appears to be the result of the introduction of lattice in expanding or oversized ions such as the gallium ion. Such fluorescent broadening, of course, would be detrimental to the laser crystal characteristics required for stimulated emission. By referring to FIG. 3, it can be seen that the fluorescence transitions in crystals of $Y_{2.5}Nd_{0.25}Lu_{0.25}Al_5O_{12}$ are quite similar to the desirable fluorescence spectra of $Y_3Al_5O_{12}$:Nd as shown in FIG. 1. Not only does the introduction of lutetium in the neodymium-doped YAG crystal preserve the beneficial fluorescence spectra characteristics of the laser material but it provides for the increased concentration of active neodymium ions without sacrificing the optical qualities of the resulting crystal.

The effect of the addition of lutetium on the concentration of neodymium in Czochralski-grown $Y_3Al_5O_{12}$ single crystals can be determined from the absorption coefficient of the neodymium ion transistion $4_{I_{9/2}} \rightarrow 4_{S_{3/2}}$ as shown in FIG. 4. The absorption coefficient on the neodymium ion is represented in arbitrary units along the axis of ordinates whereas the concentration of the neodymium ion in the melt comprising $Y_{3-x}Nd_xAl_5O_{12}$ and $Y_{3-x-y}Nd_xLu_yAl_5O_{12}$, respectively, are represented along the axis of abscissas. The concentration of neodymium in the grown crystal is proportional to the absorption coefficient values plotted in the figure. Curve 1 represents the neodymium absorption coefficients of prior art neodymium-doped YAG material whereas curve 2 represents the absorption coefficients of the increased neodymium concentrations resulting from the introduction of lutetium in the same YAG material. The increased concentrations of the neodymium ions measured by the enhanced absorption coefficients of curve 2 is achieved without sacrifice of optical quality. It has been found possible to increase the neodymium in $Y_3Al_5O_{12}$ single crystals without the introduction of size compensation ions but not without significant sacrifice of optical quality.

The lifetime of the neodymium ion as a function of the absorption coefficient (and therefore of the neodymium concentration) is represented by curve 3 of FIG. 5. As peviously mentioned, the concentration of the neodymium ion is directly proportional to the neodymium absorption coefficient of the crystal. The decrease in lifetime portrayed by curve 3 as the concentration (absorption coefficient) of the neodymium ion increases is believed to be the result of non-radiative interactions between pairs of neodymium ions which cause the excitation energy to be wasted. The optimum crystal composition for lasers is achieved when the increment of output power increase (for a given excitation energy) which results from an increase in the concentration of the active neodymium ion is compensated by the degradation of the neodymium fluorescence caused by the increasing strength of the neodymium ion pair non-radiative interactions. Preliminary emission spectrographic analysis of the lutetium-neodymium-doped YAG represented in FIG. 5 suggest that 5.0 on the scale of the neodymium absorption coefficient corresponds to approximately 3% neodymium (relative to the yttrium which it replaces). On the basis of this estimate, the quenching mechanism originating from neodymium pair interactions would dissipate aproximately 50% of the excitation radiation at a concentration of about 5% neodymium. Thus ion pair interactions reduces laser efficiency and ultimately establishes an upper limit for the useful concentration of neodymium ions in YAG host crystals.

It has been found that the optimum concentration of lutetium ions occurs when this concentration is approximately equal to the neodymium concentration. Appreciably less Lu than Nd decreases the amount of Nd ion that can be assimilated by the crystal without reduction of optical quality. When more than twice as much Lu as Nd is added to the crystals, no significant additional increase in active ion concentration is observed. In accordance with the present invention and for the presently useful range of Nd concentration of from about 0.5% ($x=0.015$) to about 20% ($x=0.6$) in $$Y_{3-x-y}Nd_xLu_yAl_5O_{12}$$

the corresponding useful range of Lu is from about 0.2% ($y=0.006$ to about 40% ($y=1.2$).

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:
1. Yttrium aluminum garnet wherein lutetium and neodymium are substituted for yttrium in accordance with the expression $Y_{3-x-y}Nd_xLu_yAl_5O_{12}$, $x$ being in the range from about 0.015 to about 0.6 and $y$ being in the range from about 0.006 to about 1.2.
2. Yttrium aluminum garnet as defined in claim 1 wherein lutetium and neodymium are of approximately equal concentrations.
3. Yttrium aluminum garnet as defined in claim 1 wherein $x$ is about 0.25 and $y$ is about 0.25.

References Cited
UNITED STATES PATENTS 3,252,103　5/1966　Geusic et al. _____ 252—301.4
3,405,371　10/1968　Johnson et al. _____ 252—301.4

ROBERT D. EDMONDS, Primary Examiner